(12) United States Patent
Janardan et al.

(10) Patent No.: US 6,502,383 B1
(45) Date of Patent: Jan. 7, 2003

(54) STUB AIRFOIL EXHAUST NOZZLE

(75) Inventors: Bangalore Ananthamurthy Janardan, West Chester, OH (US); John Francis Brausch, Clarksville, OH (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 09/652,180

(22) Filed: Aug. 31, 2000

(51) Int. Cl.$^7$ .............................................. F02K 3/02
(52) U.S. Cl. ...................... 60/226.1; 60/264; 181/213; 415/914
(58) Field of Search ................................. 60/226.1, 264; 181/213; 415/914

(56) References Cited

U.S. PATENT DOCUMENTS

| | | | |
|---|---|---|---|
| 3,455,413 A | | 7/1969 | Henley |
| 3,578,264 A | * | 5/1971 | Kuethe ........................ 181/220 |
| 3,579,993 A | | 5/1971 | Tanner et al. |
| 3,776,363 A | * | 12/1973 | Kuethe ........................ 181/213 |
| 3,910,375 A | | 10/1975 | Hache et al. |
| 4,019,696 A | * | 4/1977 | Hirt et al. ..................... 244/199 |
| 4,175,640 A | * | 11/1979 | Birch et al. .................. 181/213 |
| 4,217,756 A | | 8/1980 | Laskody |
| 4,284,170 A | | 8/1981 | Larson et al. |
| 4,354,648 A | * | 10/1982 | Schenk et al. ............... 244/130 |
| 4,401,269 A | | 8/1983 | Eiler |
| 4,422,524 A | | 12/1983 | Osborn |
| 5,156,362 A | * | 10/1992 | Leon ........................... 244/130 |
| 5,772,155 A | * | 6/1998 | Nowak ........................ 244/199 |

OTHER PUBLICATIONS

Samminy et al, "Effect of Tabs on the Flow and Noise Field of an Axisymmetric Jet," AIAA Journal, vol. 31, No. 4, 1993, pp: 609–619.
Ahuja et al, "Shear Flow Control by Mechanical Tabs," AIAA2d Shear Flow Conf., 1989, pp:1–7.
Bradbury et al, "The Distortion of a Jet by Tabs," J. Fluid Mech., 1975, vol. 70, part 4, pp: 801–813.

* cited by examiner

*Primary Examiner*—Ehud Gartenberg
(74) *Attorney, Agent, or Firm*—Rodney M. Young; Francis L. Conte

(57) ABSTRACT

A gas turbine engine exhaust nozzle includes an outlet for discharging exhaust, and a plurality of circumferentially spaced apart stub airfoils disposed adjacent the outlet. The airfoils shed vortices for mixing exhaust flow and attenuating noise and reducing infrared signature with minimum performance loss.

33 Claims, 4 Drawing Sheets

STUB AIRFOIL EXHAUST NOZZLE

BACKGROUND OF THE INVENTION

The present invention relates generally to gas turbine engines, and, more specifically, to noise suppression and infrared signature reduction therein.

In an exemplary turbofan gas turbine engine configured for powering an aircraft in flight, a fan is driven by a core engine for pressurizing ambient air to produce propulsion thrust. Combustion gases are also discharged from the core engine and contribute to propulsion thrust.

Both the fan air exhaust and the core engine exhaust are discharged at considerable exhaust jet velocities which generate noise during operation.

Various forms of jet noise suppression devices have been developed through the many decades of turbine engine use. Exhaust noise is typically reduced by reducing the maximum velocity of the exhaust streams by forced mixing with lower velocity exhaust streams. And, infrared (IR) signature is likewise reduced as the accelerated mixing process decreases the plume thermal volume.

A typical mixer is in the form of circumferentially serpentine lobes or chutes which direct fan exhaust radially inwardly and core exhaust radially outwardly for mixing together and reducing overall noise. However, the lobed mixer substantially increases engine weight and introduces aerodynamic friction and boattail drag which are undesirable, and is also relatively expensive.

Various forms of discrete tabs are also known for locally disrupting exhaust flow for effecting mixing thereof for reducing noise. However, a considerable problem associated with tabs is the associated drag and pressure losses therewith which decrease aerodynamic efficiency of the nozzle notwithstanding noise attenuation therefrom.

Accordingly, it is desired to provide an exhaust nozzle having improved noise attenuation capability with minimum reduction of aerodynamic efficiency.

BRIEF SUMMARY OF THE INVENTION

A gas turbine engine exhaust nozzle includes an outlet for discharging exhaust, and a plurality of circumferentially spaced apart stub airfoils disposed adjacent the outlet. The airfoils shed vortices for mixing exhaust flow and attenuating noise with minimum thrust loss.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
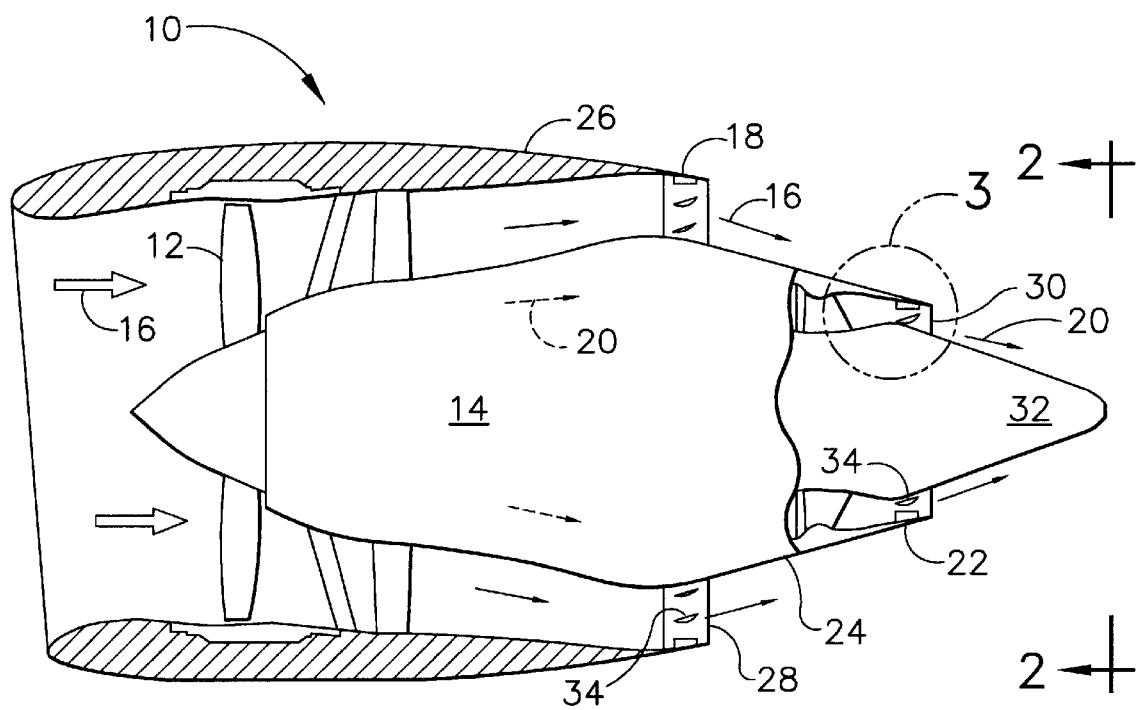
FIG. 1 is a partly sectional side elevational view of an exemplary turbofan gas turbine engine having exhaust nozzles in accordance with preferred embodiments of the present invention.

Illustrated in FIG. 1 is an exemplary turbofan gas turbine engine 10 configured for powering an aircraft (not shown) in flight. This exemplary engine includes a fan 12 having a row of fan blades extending radially outwardly from a supporting disk which is powered during operation by a core engine 14.

During operation, ambient air 16 is pressurized by the fan blades and discharged through an annular fan exhaust nozzle 18 for producing propulsion thrust for powering the aircraft in flight.

The core engine 14 includes a multistage axial compressor for pressurizing a portion of the ambient air which is then mixed with fuel and ignited for generating hot combustion gases 20 from which energy is extracted by-corresponding turbines for powering the compressor and the fan. The combustion gases 20 are discharged from the engine through a core engine exhaust nozzle 22 which contributes to the propulsion thrust of the engine.

The basic engine 10 illustrated in FIG. 1 is conventional in configuration and operation for producing the fan and core exhausts which produce propulsion thrust during operation. This typical turbofan engine is operated at a relatively high bypass ratio which is indicative of the amount of fan air which bypasses the core engine for discharge through the fan nozzle 18. The fan nozzle 18 is disposed upstream from the core nozzle 22 and is in the form of an annulus defined between the cowling 24 of the core engine and the inner surface of the fan nacelle 26. The annular outlet 28 of the fan nozzle is defined at the aft end of the nacelle 26.

The core nozzle 22 also has an annular outlet 30 defined between the inner surface of the aft end of the engine cowling 24 and the outer surface of a center plug 32. The plug 32 typically extends in the aft direction to position the core outlet 30 upstream from the aft end thereof.

Figure 2:
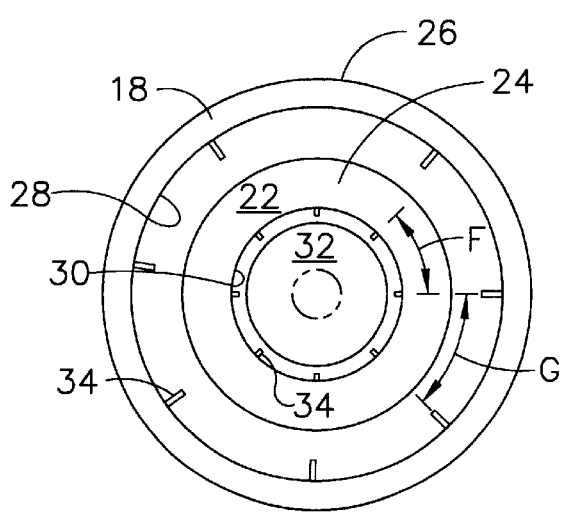
FIG. 2 is an aft-facing-forward end view of the engine illustrated in FIG. 1 and taken along line 2—2.

As shown in FIG. 2, the fan and core nozzles 18,22 are circular in this exemplary embodiment.

Gas turbine engines may have other configurations including long duct mixed flow wherein the fan nacelle extends aft to surround the core nozzle. Alternately, core nozzles may extend aft and include an internal plug or no plug. In turbojet engines the fan nozzle is eliminated and fan bypass air is channeled inside the engine to mix with the core exhaust inside the engine.

Military and advanced commercial engines may include rectangular core exhaust nozzles with adjustable exhaust flaps therein for enhanced performance. And, industrial, land-based engines are typically derived from aircraft engines and have suitably modified exhaust nozzles.

However, in these various forms of gas turbine engines, the core exhaust is discharged in a jet of high velocity generating considerable noise. And, fan nozzles, when used, discharge jets of fan air exhaust which contribute to noise.

It is therefore desirable to reduce engine exhaust noise without substantially decreasing engine aerodynamic performance or efficiency, preferably without substantially increasing weight of the engine for a typical aircraft engine application where weight is a major design objective, and reducing noise without a substantial increase in cost of the engine.

In an exemplary embodiment illustrated in FIGS. 1 and 2, the core nozzle 22 includes a plurality of circumferentially spaced apart truncated or stub airfoils 34 disposed adjacent to core outlet 30 for enhancing mixing of the core exhaust 20 with the surrounding fan exhaust 16 for attenuating jet noise during operation. Similarly, the fan nozzle 18 may also include a plurality of the stub airfoils 34 for enhancing mixing of the fan exhaust 16 with the surrounding ambient air for attenuating noise from the fan exhaust. Specific embodiments of the stub airfoils for the core nozzle are initially disclosed, followed in turn by similar embodiments for the fan nozzle.

Figure 3:
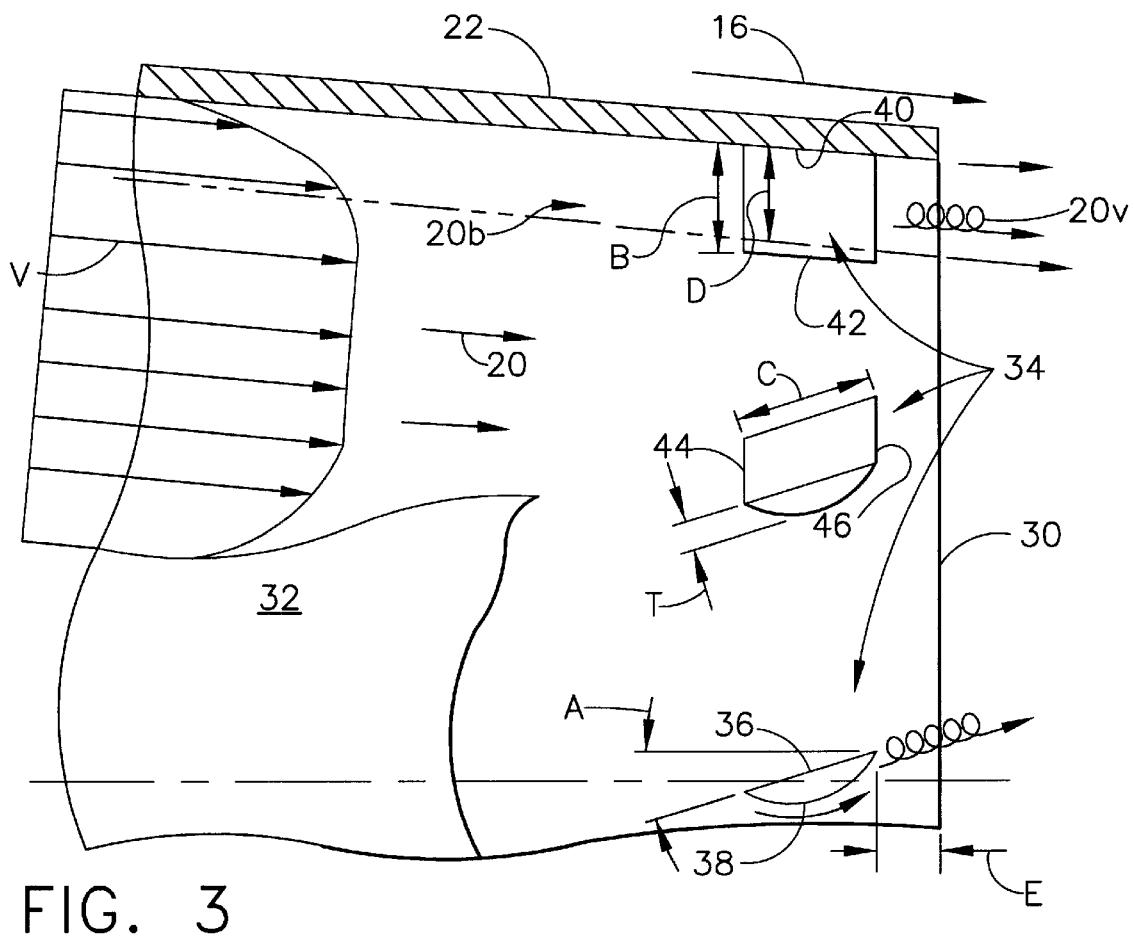
FIG. 3 is an enlarged partly sectional axial view of a portion of the core engine exhaust nozzle illustrated in FIG. 1 within the dashed circle labeled 3.

Illustrated in FIG. 3 is an exemplary embodiment of a row of the stub airfoils 34 mounted in the core nozzle 22 for mixing the core exhaust 20 with the fan exhaust 16 during operation. The individual airfoils 34 are aerodynamically streamlined and are mounted with an acute angle of incidence or attack A specifically for shedding exhaust vortices 20v during operation.

Each airfoil 34 includes a first or pressure side 36 and a circumferentially opposite second or suction side 38. The two airfoil sides extend in span B from a root 40, fixedly joined to the inner surface of the annular nozzle 22, to a tip 42 which is suspended or cantilevered from the supporting root. Each airfoil also extends in chord C generally in the axial direction from leading edge 44 to trailing edge 46, with the leading edge first engaging the core exhaust 20 being discharged in the downstream direction over the airfoils.

In the exemplary embodiment illustrated in FIG. 3, the airfoil pressure sides 36 are preferably flat from root to tip and between the leading and trailing edges. And, the suction sides 38 are preferably convex in the form of circular arcs extending from leading to trailing edge of the airfoil, and define with the flat pressure side a maximum thickness T at mid-chord. The airfoil is preferably uniform in profile from root to tip in the embodiment illustrated in FIG. 3, which configuration was built and tested for demonstrating noise attenuation over the entire audible frequency range from low, intermediate, to high frequencies with little or no aerodynamic pressure loss or drag therefrom.

By specifically configuring the stub airfoils 34 with minimum span height and with an aerodynamically streamlined profile, the airfoils have minimal impact on aerodynamic performance of the exhaust nozzle. However, the aerodynamic profile of the airfoil may be used in conjunction with the acute angle of attack A for specifically generating and shedding vortices 20v along the trailing edge 46 of the airfoils during operation. Vortex shedding may be initiated at any suitable location forward of or at the trailing edge for discharging vortices downstream therefrom.

The shedding vortices provide a mechanism for locally mixing the core exhaust, with the vortices therein increasing in size and strength in the downstream direction. The enhanced mixing of the exhaust flows decreases the velocity gradients thereof for attenuating noise, and reducing plume thermal volume with reduced IR signature.

As shown schematically in FIG. 3, the airfoil height or span B is on the order of or preferably substantially equal to about the thickness D of a local boundary layer 20b of the core exhaust at the location of the airfoils. Also shown in FIG. 3 is a general distribution of exhaust velocity V, which rises from minimum values along the two boundary surfaces of the core nozzle to a maximum or peak velocity across the radial middle of the core nozzle annulus.

The exhaust boundary layer 20b is a local layer of relatively low velocity exhaust flow which flows along the inner surface of the exhaust nozzle, and in which a steep velocity gradient occurs. In accordance with one definition ("Boundary Layer Theory", Schlichting, 1960), the boundary layer thickness D is that distance from the flow boundary wall where the velocity differs by one percent (1%) from the high velocity of the central exhaust flow.

By limiting the airfoil span B to not much greater than the thickness D of the local boundary layer, the exhaust vortices may be shed within the boundary layer and will grow in size and strength as they move axially aft thereby promoting mixing of the core exhaust flow with the fan exhaust flow.

The airfoils 34 are thusly configured as relatively short inserts or stubs which terminate near the border of low velocity boundary layers of the exhaust flow and the high velocity central exhaust flow. The radial span of the stub airfoils is preferably limited to a relatively small portion of radial extent of the nozzle generally equal to the corresponding narrow exhaust boundary layers 20b therein.

The stub airfoils therefore do not obstruct the high velocity portion of the exhaust flow and are not subject to the substantial drag or pressure losses therefrom. By confining the stub airfoils to the boundary layer region of the exhaust flow, they introduce little if any pressure or drag losses with minimum thrust reduction, yet shed vortices which grow in size and strength downstream therefrom for enhancing exhaust mixing and substantially reducing noise and plume thermal volume.

Alternatively, the airfoil span B may be less than or greater than the boundary layer thickness D. The greater span B may introduce aerodynamic performance losses while increasing the mixing effectiveness, which can be acceptable in some applications. Such losses may be reduced or eliminated by selectively retracting or stowing the stub airfoils from their deployed and extended position during suitable portions of the aircraft mission.

In the exemplary embodiment illustrated in FIG. 3, the stub airfoils 34 extend radially inwardly from the outer boundary of the core nozzle to protrude into the outer boundary layer of the core exhaust 20 itself. Since the exemplary form of the core nozzle is annular, the airfoils extend radially inwardly. For a non-axisymmetric exhaust nozzle, e.g. rectangular, the corresponding stub airfoils would extend perpendicularly inwardly from any one or more surfaces defining that nozzle as desired.

For the annular core nozzle 22 illustrated in FIG. 3, the center plug 32 is disposed concentrically inside the nozzle outlet 30 to define the inner boundary of the nozzle, and the airfoils 34 extend radially inwardly toward and terminate well short of the plug. The nozzle is unobstructed between the airfoils and the plug for maintaining a large flow area without significantly reducing aerodynamic performance of the nozzle.

In the preferred embodiment illustrated in FIG. 3, the airfoils 34 are spaced forwardly or upstream from the nozzle outlet 30 with an axial spacing E between the outlet and the airfoil trailing edges. The axial setback spacing E may be selected for maximizing the vortex shedding growth prior to discharge from the nozzle outlet to maximize mixing performance.

Figure 4:
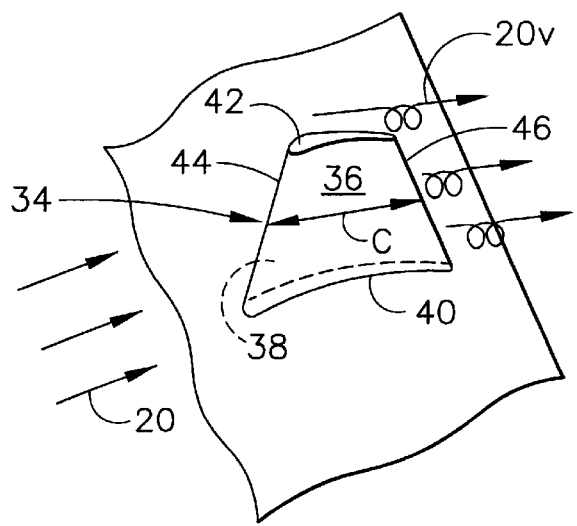
FIG. 4 is an isometric view of a stub airfoil for the exhaust nozzles of the engine illustrated in FIG. 1 in accordance with an alternate embodiment of the present invention.

In the FIG. 3 embodiment, the airfoil chord C is substantially equal from root to tip of the airfoils. FIG. 4 illustrates an alternate embodiment in which the airfoils vary in chord length C from root 40 to tip 42, preferably decreasing in chord length therebetween. The tapered stub airfoils shed vortices at or near the trailing edges thereof from root to tip.

The FIG. 4 embodiment of the airfoil 34 is preferably crescent shaped with a generally concave pressure side 36 and a generally convex suction side 38 in the form of a typical aerodynamically contoured airfoil for minimizing pressure losses therefrom, but with an attack angle selected to shed vortices from the airfoil suction sides at the trailing edges. The specific aerodynamic contour of the airfoil in conjunction with the acute angle of attack may be used for maximizing vortex shedding while minimizing associated pressure losses.

The airfoil is aerodynamically streamlined for minimizing obstruction or drag in the exhaust flow while efficiently shedding vortices therein. Streamlining may be effected by using the smooth pressure and suction sides with narrow airfoil thickness therebetween facing the oncoming exhaust. The airfoil leading edge smoothly splits the exhaust which flows with minimal drag over the narrow airfoil. Thin airfoil profile and attack angle are then used to shed vortices with minimal pressure loss.

Figure 5:
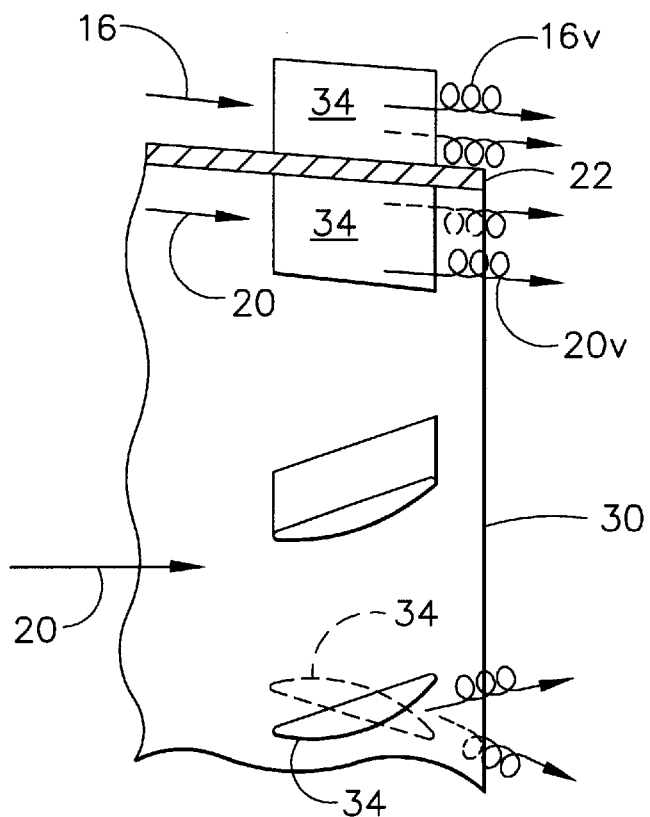
FIG. 5 is an enlarged partly sectional view of a portion of an exhaust nozzle like that shown in FIG. 3 having stub airfoils in accordance with another embodiment of the present invention.

Illustrated in FIG. 5 is another embodiment of the present invention specifically configured for the core nozzle 22 in which another row of the stub airfoils 34 extends radially outwardly for shedding vortices 16v in the surrounding fan air or exhaust fluid 16. As shown in FIG. 1, the fan exhaust 16 is discharged from the fan nozzle 18 and flows downstream over the core cowling for discharge around the core nozzle 22. The core nozzle may therefore include the radially outwardly extending stub airfoils 34 similarly configured in span height corresponding with the height of the local fan air boundary layer at this location. The fan air vortices 16v shed from these outboard airfoils promote mixing with the core exhaust 20 being discharged from the core nozzle.

In the FIG. 5 embodiment, the outboard row of stub airfoils 34 extends radially outwardly, and may cooperate with the inboard row of stub airfoils 34 extending radially inwardly inside the core nozzle 22 as described above. In this way, vortices are shed both in the core exhaust 20 and in the fan exhaust 16 for enhancing downstream mixing thereof. However, the outboard row of stub airfoils 34 may be used without the inboard row of stub airfoils if desired.

The two rows of stub airfoils illustrated in FIG. 5 may have the same angles of attack, or may have opposite angles of attack as illustrated. The magnitude of the angles of attack may be equal, but the outboard and inboard airfoils may be twisted oppositely for correspondingly shedding the vortices therefrom. The outboard and inboard stub airfoils may be radially aligned with each other as illustrated, or may be circumferentially offset from each other as desired for maximizing performance of the airfoils.

Figure 6:
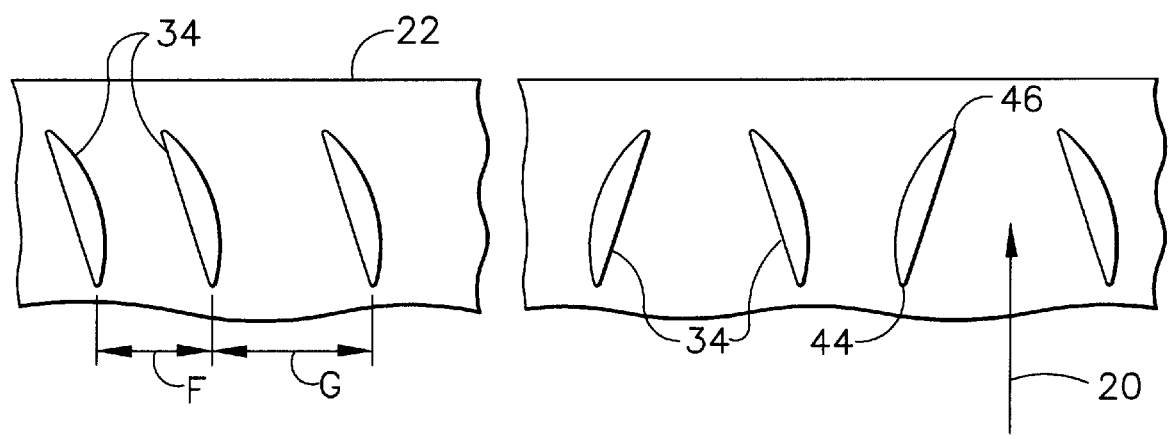
FIG. 6 is a planiform view of a portion of an exhaust nozzle having stub airfoils in accordance with alternate embodiments of the present invention.

In a preferred embodiment illustrated in FIGS. 2 and 6, the stub airfoils 34 have a substantially equal pitch F around the circumference of the exhaust nozzle for uniformly distributing vortices therearound.

Alternatively, the stub airfoils 34 may have a substantially unequal pitch G which correspondingly varies from airfoil to airfoil in an asymmetric configuration as desired. For example, the engine may be pylon mounted, and the portions of the exhaust nozzles below the pylon may be devoid or free of stub airfoils in view of the aerodynamic interaction with the pylon during operation. The airfoil pitch may vary as desired for each particular engine application for maximizing noise attenuation while minimizing aerodynamic performance losses.

Furthermore, the individual airfoils in each row may have the same angle of attack and same direction or inclination in some embodiments, but may alternatively be disposed in cooperating pairs of oppositely directed airfoils as illustrated in the right half of FIG. 6. The airfoil pairs may converge in the downstream direction to shed cooperating paired vortices for increasing the effect of vortex enhanced mixing in particular designs.

Figure 7:
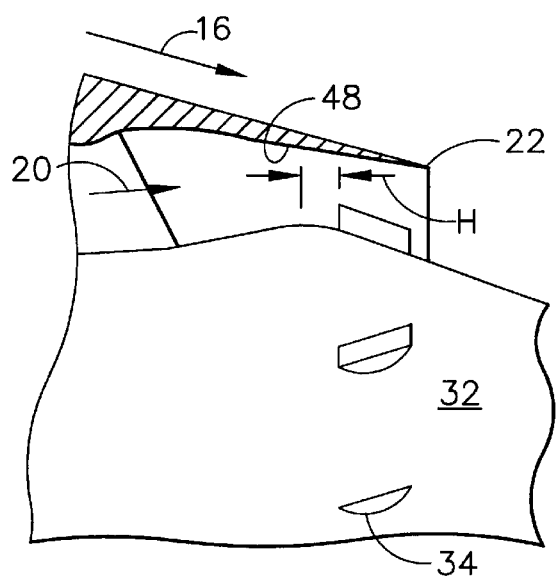
FIG. 7 is an enlarged view of a portion of the core exhaust nozzle illustrated in FIG. 1 within the dashed circle labeled 3 in accordance with another embodiment of the present invention.

FIG. 7 illustrates an alternate embodiment in which the stub airfoils 34 extend radially outwardly from the center plug 32 inside the core nozzle 22. In this way, the airfoils extend outwardly toward the outer boundary of the core nozzle and shed vortices within the inner boundary layer of exhaust flow 20 along the outer surface of the center plug 32. If desired, both the outboard protruding airfoils in FIG. 7 may be used in conjunction with the inboard protruding airfoils 34 illustrated in FIG. 3.

The center plug 32 illustrated in FIG. 7 typically converges in the downstream direction from a maximum diameter defining a throat 48 of the core nozzle, and the stub airfoils 34 are preferably spaced aft or downstream from the throat for shedding vortices in the expanding core exhaust being discharged from the nozzle. The amount of aft spacing H may be determined in each design application for maximizing vortex shedding while minimizing thrust losses.

Figure 8:
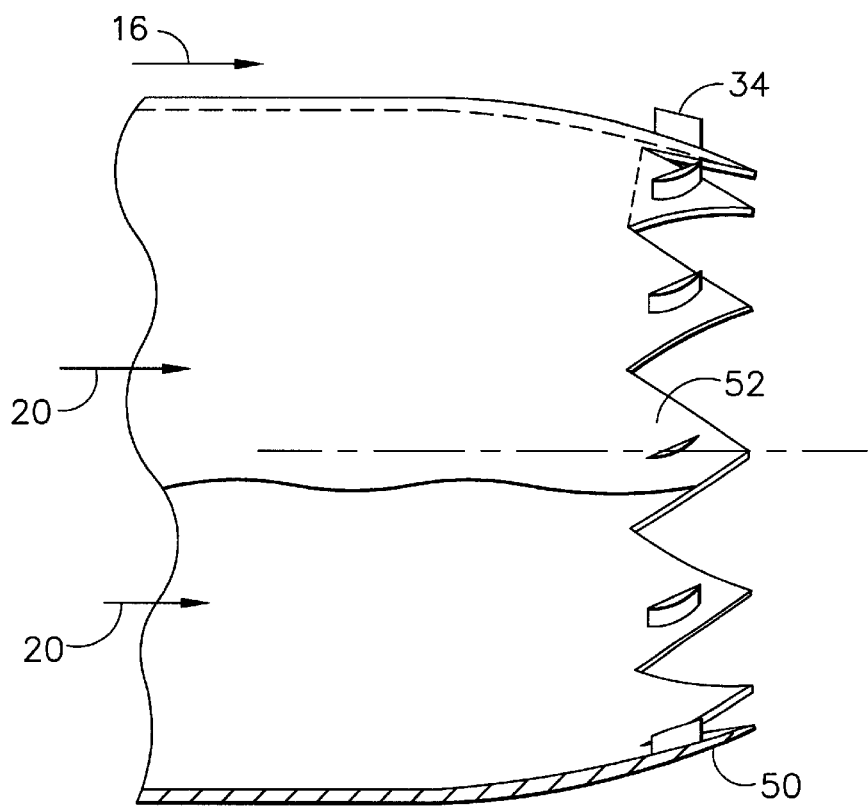
FIG. 8 is a partly sectional axial view of the core exhaust nozzle for the engine of FIG. 1 in accordance with another embodiment of the present invention.

Illustrated in FIG. 8 is an alternate embodiment of a chevron exhaust nozzle 50 which may be used for either a fan nozzle 18 or the core nozzle 22. The chevron nozzle 50 includes a plurality of circumferentially adjoining triangular chevrons 52 having compound axial and circumferential curvature in the form of shallow bowls preferably facing radially inwardly, although the shallow bowls could face radially outwardly if desired. The chevrons converge in the downstream direction and themselves shed vortices along the converging trailing edges thereof for promoting exhaust flow mixing. The chevrons may have any other suitable configuration and curvature.

The stub airfoils 34 may be mounted on selected ones of the chevrons for extending radially outwardly into the fan stream, or radially inwardly into the core stream as desired. In this way, the stub airfoils additionally shed vortices for attenuating noise with minimal thrust losses.

The various embodiments of the stub airfoils 34 described above for the core nozzle 22 may be similarly applied in the fan exhaust nozzle 18 as well. For example, and as shown in FIGS. 1 and 2, the stub airfoils 34 preferably extend radially inwardly from the outer boundary of the annular fan nozzle 18 for shedding vortices in the fan air 16 being discharged through the fan nozzle outlet 28.

The stub airfoils 34 described above are relatively simple in configuration and relatively small and may be readily mounted in a gas turbine engine wherever exhaust flow is being discharged, whether fan air or core exhaust. The airfoils have a unique aerodynamic profile or shape which is streamlined for minimizing aerodynamic pressure losses therefrom while being specifically configured for shedding vortices. Unlike a conventional airfoil configured for generating lift from its suction surface without undesirable flow separation, the stub airfoils are specifically designed not for generating lift but for shedding vortices from the trailing edges thereof which may be enhanced by intentionally introducing flow separation along the suction side terminating at the trailing edge.

The stub airfoils protrude principally into, or slightly beyond, the flow stream boundary layer instead of highly penetrating the high velocity exhaust stream. They therefore introduce vortex shedding in the lower velocity boundary layers without obstructing the high velocity exhaust flows located outwardly therefrom.

The stub airfoils provide an aerodynamically smooth flow guidance for the boundary layer flow while generating strong streamwise vortices which accelerate the mixing process. The airfoils may be circumferentially or linearly spaced apart from each other in similar orientations to the flow, or may be paired for shedding vortices in cooperating pairs and enhancing flow mixing.

The enhanced flow mixing attributable to the stub airfoils results in a shorter jet plume length and reduced plume volume, thereby lowering the levels of produced audible jet noise. Correspondingly, the hot exhaust flow is mixed with cooler air for reducing plume thermal volume and thusly reducing infrared signature which is desirable in military and specialized commercial applications.

Testing of the stub airfoils has demonstrated decreased jet noise over most of the audible frequency range from low to high frequencies, as well as reduced infrared signature of the jet plume with minimal thrust loss.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine exhaust nozzle including a flow boundary surface and an outlet for discharging exhaust, and a plurality of circumferentially spaced apart stub airfoils disposed adjacent said outlet and extending from said flow boundary surface with a span no greater than about a thickness of a local boundary layer of flow thereover.

2. A nozzle according to claim 1 wherein said airfoils are aerodynamically streamlined, and have an acute angle of attack for shedding vortices.

3. A nozzle according to claim 2 wherein said airfoils further include opposite pressure and suction sides extending in span from a root to a tip, and extending in chord from leading to trailing edges, and said suction side is convex along said chord to effect flow separation therefrom for shedding said vortices along said trailing edge.

4. A nozzle according to claim 3 wherein said airfoil span is sized to substantially equal said local boundary layer thickness.

5. A nozzle according to claim 3 wherein said airfoils extend inwardly inside said nozzle.

6. A nozzle according to claim 3 wherein said airfoils extend outwardly outside said nozzle.

7. A nozzle according to claim 3 wherein one row of said airfoils extends inwardly inside said nozzle, and another row of said airfoils extends outwardly outside said nozzle.

8. A nozzle according to claim 7 wherein said inward and outward airfoils have opposite angles of attack.

9. A nozzle according to claim 3 wherein said airfoils have equal pitch.

10. A nozzle according to claim 3 wherein said airfoils have unequal pitch.

11. A nozzle according to claim 3 wherein said airfoils are spaced forwardly from said nozzle outlet.

12. A nozzle according to claim 3 wherein said airfoils have substantially equal chord length from root to tip.

13. A nozzle according to claim 3 wherein said airfoils decrease in chord length from root to tip.

14. A nozzle according to claim 3 wherein said pressure sides are flat, and said suction sides are convex circular arcs.

15. A nozzle according to claim 3 wherein said pressure sides are concave along said chord.

16. A nozzle according to claim 3 in the form of a core engine exhaust nozzle for discharging combustion exhaust through said nozzle outlet.

17. A nozzle according to claim 16 wherein said airfoils extend inwardly inside said nozzle for shedding vortices in said exhaust.

18. A nozzle according to claim 16 wherein said airfoils extend outwardly outside said nozzle for shedding vortices in a surrounding fluid.

19. A nozzle according to claim 16 wherein said nozzle outlet is annular, and said airfoils extend radially.

20. A nozzle according to claim 16 further comprising a center plug disposed concentrically inside said nozzle outlet, and said airfoils extend radially inwardly toward said plug.

21. A nozzle according to claim 16 further comprising a center plug disposed concentrically inside said nozzle outlet, and said airfoils extend radially outwardly from said plug.

22. A nozzle according to claim 21 wherein said plug converges from a maximum diameter defining a throat in said nozzle, and said airfoils are spaced aft from said throat.

23. A nozzle according to claim 16 further comprising a plurality of circumferentially adjoining triangular chevrons, and said airfoils extend from respective ones of said chevrons.

24. A nozzle according to claim 23 wherein said airfoils extend radially inwardly.

25. A nozzle according to claim 23 wherein said airfoils extend radially outwardly.

26. A nozzle according to claim 3 in the form of a fan exhaust nozzle for discharging fan air 16 through said nozzle outlet.

27. A nozzle according to claim 26 wherein said airfoils extend radially inwardly.

28. A gas turbine engine core exhaust nozzle comprising:
a flow boundary surface and an outlet for discharging combustion exhaust;
a plurality of circumferentially spaced apart stub airfoils spaced forwardly from said outlet and extending from said flow boundary surface with a span no greater than about a thickness of a local boundary layer of flow thereover; and
each of said airfoils including opposite pressure and suction sides extending in span from root to tip, and extending in chord from leading to trailing edges, and said suction side is convex along said chord to effect flow separation therefrom for shedding vortices along said trailing edge inside said boundary layer.

29. A nozzle according to claim 28 wherein said airfoils extend inwardly inside said nozzle for shedding vortices in a boundary layer of said exhaust.

30. A nozzle according to claim 29 wherein said airfoils are aerodynamically streamlined, have an acute angle of attack for shedding vortices, and said airfoil span is sized to substantially equal said local boundary layer of said exhaust thereat.

31. A gas turbine engine fan exhaust nozzle comprising;
a flow boundary surface and an outlet for discharging fan air;
a plurality of circumferentially spaced apart stub airfoils spaced forwardly from said outlet and extending radially inwardly from said flow boundary surface with a span no greater than about a thickness of a local boundary layer of said fan air flow thereover; and each of said airfoils includes opposite pressure and suction sides extending in span from root to tip, and extending in chord from leading to trailing edges, and said suction side is convex along said chord to effect flow separation therefrom for shedding vortices along said trailing edge inside said fan air boundary layer.

32. A nozzle according to claim 31 wherein said airfoil pressure sides are flat and said suction sides are circular arcs.

33. A nozzle according to claim 32 wherein said airfoils are aerodynamically streamlined, have an acute angle of attack for shedding vortices, and said airfoil span is sized to substantially equal said local boundary layer of said fan air thereat.

* * * * *